(12) United States Patent
Voegel et al.

(10) Patent No.: US 12,606,329 B2
(45) Date of Patent: Apr. 21, 2026

(54) METHOD AND MOBILE TRANSPORT UNIT FOR COMMISSIONING A FIELD DEVICE OR A SERVICE JOB ON THE FIELD DEVICE IN AN AUTOMATION ENGINEERING INSTALLATION

(71) Applicant: Endress+Hauser Process Solutions AG, Reinach (CH)

(72) Inventors: Michael Voegel, Hagenthal le bas (FR);
Stefan Griner, Lausen (CH);
Alexander Franke, Birsfelden (CH);
Joachim Wagner, Lörrach (DE)

(73) Assignee: Endress+Hauser Process Solutions AG, Reinach (CH)

( * ) Notice: Subject to any disclaimer, the term of this patent is extended or adjusted under 35 U.S.C. 154(b) by 435 days.

(21) Appl. No.: 18/258,755

(22) PCT Filed: Nov. 18, 2021

(86) PCT No.: PCT/EP2021/082176
§ 371 (c)(1),
(2) Date: Jun. 21, 2023

(87) PCT Pub. No.: WO2022/135802
PCT Pub. Date: Jun. 30, 2022

(65) Prior Publication Data
US 2024/0034492 A1      Feb. 1, 2024

(30) Foreign Application Priority Data
Dec. 21, 2020    (DE) ..................... 10 2020 134 444.9

(51) Int. Cl.
B64U 80/30        (2023.01)
B64U 20/87        (2023.01)
(Continued)

(52) U.S. Cl.
CPC ............. B64U 80/30 (2023.01); B64U 20/87 (2023.01); B64U 30/20 (2023.01); G10L 13/027 (2013.01);
(Continued)

(58) Field of Classification Search
None
See application file for complete search history.

(56) References Cited

U.S. PATENT DOCUMENTS 9,471,059 B1 * 10/2016 Wilkins ............... G05D 1/0016
10,777,051 B1 * 9/2020 Kumar ................... G08B 7/066
(Continued)

FOREIGN PATENT DOCUMENTS

DE    102014103426 A1    9/2014
DE    102019126463 A1    4/2020
DE    102018130989 A1 *  6/2020    ......... G05B 19/0428

OTHER PUBLICATIONS

Machine translation of DE-102018130989-A1 (Year: 2025).*

*Primary Examiner* — Jennifer M Anda
(74) *Attorney, Agent, or Firm* — Mark A. Logan; Endress+Hauser (USA) Holding, Inc.

(57) ABSTRACT

A method for commissioning a field device or a service job on the field device uses a mobile transport unit having a position determination unit designed for navigation and further having an output unit. The method includes: transmitting a commissioning or service notification to the mobile transport unit, wherein the notification contains the identification of the field device and an operating action to be carried out on the field device; locating the installation position of the field device by the mobile transport unit based on the identification of the field device; guiding an operator to the installation position via autonomous navigation of the mobile transport unit through the installation; and assisting the operator when performing the operating action, (Continued)

wherein the mobile transport unit specifies and/or explains to the operator all operations or actions to be carried out.

20 Claims, 2 Drawing Sheets

(51) Int. Cl.
  B64U 30/20 (2023.01)
  B64U 101/30 (2023.01)
  G10L 13/027 (2013.01)
  G10L 13/033 (2013.01)
(52) U.S. Cl.
  CPC ........ G10L 13/033 (2013.01); B64U 2101/30 (2023.01); B64U 2201/10 (2023.01)

(56) References Cited

U.S. PATENT DOCUMENTS

| | | | |
|---|---|---|---|
| 10,798,237 B2 * | 10/2020 | Borse | G08B 21/02 |
| 2014/0277605 A1 * | 9/2014 | Nixon | H04L 67/12 |
| | | | 700/49 |
| 2016/0282872 A1 * | 9/2016 | Ahmed | G05D 1/102 |
| 2017/0286892 A1 * | 10/2017 | Studnicka | G06Q 20/3224 |
| 2018/0029706 A1 * | 2/2018 | Baruch | B64U 10/13 |
| 2020/0033826 A1 * | 1/2020 | Sotriffer | G05B 19/4184 |
| 2020/0103881 A1 * | 4/2020 | Halgren, III | G05D 1/0044 |

* cited by examiner

METHOD AND MOBILE TRANSPORT UNIT FOR COMMISSIONING A FIELD DEVICE OR A SERVICE JOB ON THE FIELD DEVICE IN AN AUTOMATION ENGINEERING INSTALLATION

CROSS-REFERENCE TO RELATED APPLICATIONS

The present application is related to and claims the priority benefit of DPMA Patent Application No. 10 2020 134 444.9, filed on Dec. 21, 2020, and International Patent Application No. PCT/EP2021/082176, filed Nov. 18, 2021, the entire contents of which are incorporated herein by reference.

TECHNICAL FIELD

The invention relates to a method for commissioning a field device or a service job on the field device in an automation engineering installation, a mobile transport unit being used in the installation, the mobile transport unit having a position determination unit and being designed for navigation in the installation, and the mobile transport unit having at least one output unit.

BACKGROUND

Field devices that are used in industrial installations are already known from the prior art. Field devices are often used in automation engineering as well as in manufacturing automation. In principle, all devices which are process-oriented and which supply or process process-relevant information are referred to as field devices. Field devices are thus used for detecting and/or influencing process variables. Sensor units are used for detecting process variables. These are used, for example, for pressure and temperature measurement, conductivity measurement, flow measurement, pH measurement, fill-level measurement, etc. and detect the corresponding process variables of pressure, temperature, conductivity, pH value, fill-level, flow, etc. Actuator systems are used for influencing process variables. These are, for example, pumps or valves that can influence the flow of a fluid in a pipe or the fill level in a tank. In addition to the aforementioned measuring devices and actuators, field devices are also understood to include remote I/Os, radio adapters, or, generally, devices that are arranged at the field level.

In modern industrial plants, field devices are usually connected to superordinate units via communication networks such as fieldbuses (Profibus®, Foundation® Fieldbus, HART®, etc.). The superordinate units are control units, such as a PLC (programmable logic controller), a PCS (process control system) or Cloud (database which can be contacted via the Internet). The superordinate units are used inter alia for process control, data storage and data evaluation, as well as commissioning of the field devices. The measured values detected by the field devices, especially by the sensors, are transmitted via the respective bus system to a (or possibly a plurality of) superordinate unit(s) that further process the measured values, as appropriate, and relay them to the control station or further systems of the installation. The control station and the further systems are used for process visualization, process monitoring, process optimization, maintenance, data analysis and process control via the superordinate units. In addition, data transmission from the superordinate unit via the bus system to the field devices is also required, especially for configuration and parameterization of field devices and for controlling actuators.

In the course of the progressive digitization with regard to the key words "Internet of Things (IoT)" and "Industry 4.0", which also does not stop at components of process installations, there is an increased need to make available data from field devices, in particular measurement data, diagnostic data, parameter values, etc. at a central location, and to create value from these data (key words for this are "Big Data Analysis", "Predictive Maintenance", etc.). The central location is often understood to mean a platform that can be contacted via the Internet, in particular what is known as a cloud-based platform.

Despite the progressive digitization, service personnel are required to physically find the field devices for the purpose of commissioning and/or maintenance and service work and perform corresponding operations and operating actions on the field device. However, there are fewer and fewer service personnel employed. The service staff are nowadays also less specialized, which is due to the fact that the field device portfolio of the various field device manufacturers is ever increasing. The complexity of the activities to be carried out by the service personnel is ever increasing, e.g. the maintenance of the production installations in good state and the anticipation of and preparation for future work.

In addition, a service technician generally works alone, which under certain circumstances requires a great deal of time and is associated with safety problems. The daily activities that the service technician must perform are very demanding—support by a second service technician would be very welcome and would reduce the working time and thus may increase the availability of the installation. For example, when understanding the diagnosis delivered by a field device, when proposing corrective measures, and when planning the intervention in the production program.

A service technician could also have a physical impairment that can restrict or prevent certain activities in the field.

SUMMARY

Proceeding from this problem, the object of the invention is to increase the efficiency of an operator during commissioning of a field device, and to increase the resolution of service jobs on a field device and to reduce the susceptibility to errors.

The object is achieved by a method for commissioning a field device or a service job on the field device in an automation engineering installation, a mobile transport unit being used in the installation, the mobile transport unit having a position determination unit and being designed for navigation in the installation, and the mobile transport unit having at least one output unit, said method comprising:

transmitting a commissioning notification or a service notification to the mobile transport unit, the commissioning notification or the service notification containing the identification of the relevant field device and at least one operator action to be carried out on the field device;

locating the installation position of the field device in the installation by means of the mobile transport unit on the basis of the identification of the relevant field device;

guiding an operator to the installation position of the field device by means of autonomous navigation of the mobile transport unit, using the position determination unit, through the installation, the operator following the mobile transport unit; and assisting the operator when performing the operating action, the mobile transport unit specifying and/or explaining to the operator all operations or actions to be carried out to successfully carry out the operating action by means of the at least one output unit.

The advantage of the method according to the invention is that an operator is supported by a mobile transport unit while performing operating actions on a field device. For this purpose, the mobile transport unit guides the operator, in a first step, through the installation to the corresponding field device. In a second step, the actual assistance follows, in which the operations to be carried out are explained to the operator. Errors when performing the operating actions can thus be reduced.

The operator is, for example, an employee of the service personnel of the installation or of the field device manufacturer, in particular a service technician.

The operations or actions to be carried out are both physical actions, for example the connection of cables, work on hardware components of the field device or the measurement environment thereof (flanges, pipelines, fastenings, etc.) and software-side operations, for example the parameterization of a field device.

Field devices that are mentioned in connection with the method according to the invention have already been described by way of example in the introductory part of the description. In the event that the field device is designed to detect at least one physical, chemical or other variable in the process, the field device has a sensor unit which serves to detect the variable, for example a temperature value, a pressure, a density, etc. In the event that the field device is designed to influence variables of a process-engineering process, the field device has an actuator unit, for example a valve, which serves to influence the variables of the process-engineering process, for example adjustment of a flow value.

According to an advantageous embodiment of the method according to the invention, it is provided that, in the course of the assistance, the mobile transport unit establishes a wireless first communication link and reads out data, in particular parameter or configuration settings, a device status, or measured values, from the field device via the communication link, the specification and/or explanation of the operations or actions to be carried out being adapted to the data read out. For this purpose, the wireless first communication link is based, for example, on Bluetooth, in particular Bluetooth LE, WiFi or Wireless HART. For many of the operations or actions to be carried out, data of the field devices are required. For example, if an error occurs at a field device, the exact error cause must be determined, for which special diagnostic messages and/or certain parameter values are consulted.

According to an advantageous embodiment of the method according to the invention, it is provided that the mobile transport unit is at least temporarily in a second communication link, via the Internet, with a cloud-based platform, the commissioning notification or the service notification being transmitted via the second communication link from the cloud-based platform to the mobile transport unit. The second communication link is established, for example, via a mobile radio network or via WiFi. The mobile transport unit has the necessary hardware and software for this, and optionally a SIM card. Furthermore, the mobile transport unit has the corresponding information in order to make contact with the cloud-based platform, and optionally to be able to authenticate/authorize itself. In order to transmit the commissioning notification or the service notification, the mobile transport unit is registered in advance in the cloud-based platform.

Alternatively, the second communication channel can also be established via the communication network (for example via a gateway used in the communication network to or from which the mobile transport unit transmits or receives data wirelessly) into which the field device is integrated and transmits its collected measured values to a control station of the installation. As described above, this communication network can be an automation engineering fieldbus. In this communication network, what is known as an edge device is then used, which transmits data from this communication network (i.e. also the data of the mobile transport unit) to the cloud-based platform via the Internet, or receives data from this cloud-based platform.

"Cloud-based platform" refers to a server which can be contacted by an operator, the field devices and/or the mobile transport unit via the Internet or a local network, and on which one or more applications are executed, which enable the creation and transmission of the commissioning notification and/or the service notification to the mobile transport unit.

According to an advantageous embodiment of the method according to the invention, it is provided that the mobile transport unit, in the event that the second communication link cannot be established at the current location position of the mobile transport unit, navigates to a defined location position in the installation, at which defined location position the second communication link can be established, the mobile transport unit establishing the second communication link after the navigation to the defined location position, and the mobile transport unit temporarily storing data to be transmitted to the cloud-based platform and/or the commissioning notification and/or service notification transmitted from the cloud-based platform, before or after the establishment of the communication link at the defined location position. Depending on the position in the installation, the second communication link cannot be established if, for example, WiFi routers are outside the range of the mobile transport unit or if the structure of the installation, for example a shielding metal roof, does not allow a connection to a mobile radio network. The defined location position represents a location within (or optionally outside) the installation, on which the corresponding infrastructure for establishing the second communication link is present, for example a WiFi router. The defined location position is also used for charging the mobile transport unit and has the technical infrastructure required for this purpose.

According to an advantageous development of the method according to the invention, it is provided that the mobile transport unit has a camera unit, and the mobile transport unit observing the operator and adjusting the speed during navigation to the speed of the operator, during the guidance of the operator to the installation position of the field device. It is provided here that the mobile transport unit moves in front of the operator and the operator follows the mobile transport unit. The mobile transport unit determines in advance the route to the field device, for example by means of GPS or by means of an installation map. In particular, it is provided that the distance to the operator is not greater than a predetermined value. If the mobile transport unit notices that it is difficult for the operator to follow, the mobile transport unit reduces its speed accordingly, or increases its speed if the operator is located too close.

According to an advantageous embodiment of the method according to the invention, it is provided that the mobile transport unit indicates movable and/or stationary obstacles to the operator, during the navigation, by means of the output unit, the mobile transport unit detecting and recognizing the movable or stationary obstacles by means of the camera unit, and/or the stationary obstacles having been previously made known to the mobile transport unit, for example by means of an installation map stored on the mobile transport unit. Depending on the design of the output unit, the indication can take place visually and/or acoustically. The stationary obstacles are immovable obstacles located at fixed location positions in the installation, for example walls or installation components (for example containers or pipelines). The movable obstacles are obstacles temporarily located at a location (for example, deliveries such as pallets or cardboard boxes, etc.) or obstacles constantly changing their location position (eg. people, further mobile transport units, etc.).

According to an advantageous embodiment of the method according to the invention, it is provided that a display or a projector is used as the output unit, installation information and/or product information of the field device being visualized for the specification and/or explanation of the operations or actions to be carried out. For example, videos are visualized which display the operations or actions to be carried out, or device documentation is displayed.

According to an advantageous embodiment of the method according to the invention, it is provided that an acoustic reproduction means, in particular a loudspeaker, is used as the output unit, the specification and/or explanation of the operations or actions to be carried out taking place by means of voice output. The voice output is carried out, for example, using previously recorded voice recordings, or is generated by the mobile transport unit, for example an artificial voice based on "Text-to-Speech".

According to an advantageous embodiment of the method according to the invention, it is provided that the artificial voice used for the voice output varies depending on the criticality of the operation or action to be carried out, in particular with respect to the volume, the voice color and/or the speech speed.

According to an advantageous embodiment of the method according to the invention, it is provided that the mobile transport unit has an additional output unit in the form of a laser pointer, the mobile transport unit pointing, by means of the additional output unit, during the specification and/or explanation of the operations or actions to be carried out, at places or components of the field device and/or the installation that are important for performing the operations or actions. This is provided in particular for operations or actions to be carried out physically.

According to an advantageous embodiment of the method according to the invention, it is provided that, in the course of the assistance, the operator issues questions to the mobile transport unit with respect to the operations or actions to be carried out, and the mobile transport unit outputting to the operator, by means of the output unit, further information regarding the operations or actions to be carried out, depending on the questions. Depending on the output unit, the responses can be output in text form or by voice output.

According to a first variant of the method according to the invention, it is provided that the mobile transport unit has an input unit, in particular a microphone unit or a touch display, for inputting the questions, the mobile transport unit analyzing the questions by means of an AI algorithm or by means of additional data, in particular called up by the field device and/or by the cloud-based platform, and the mobile transport unit generating the further information by means of the AI algorithm or the additional data.

According to a second variant of the method according to the invention, it is provided that the mobile transport unit has an input unit, in particular a microphone unit or a touch display, for inputting the questions, and the mobile transport unit transmitting the questions by means of the second communication link to the cloud-based platform, the cloud-based platform analyzing the questions by means of an AI algorithm or additional data, in particular stored on the cloud-based platform and/or called up by the field device, the cloud-based platform generating the further information by means of the AI algorithm or the additional data, and the cloud-based platform transmitting the further information via the second communication link to the mobile transport unit.

It can also be provided, for both variants, that the input unit is not part of the mobile transport means, but rather part of a mobile control unit, in particular a tablet or a smartphone, which has an operator application for the mobile transport unit and which transmits the questions to the mobile transport unit by means of a third wireless communication link, or which operator application has the AI algorithm and performs the analysis of the questions and the creation of the further information, or which operator application transmits the questions to the cloud-based platform and receives the further information, specifies them to the user, and/or transmits them to the mobile transport unit. In both cases, the AI algorithm can be designed, for example, as a neural network, or be based on deep learning or a similar suitable method, and can be learned beforehand by means of training data relating to specific operations for the corresponding applications and corresponding text and/or speech recognition.

An advantageous development of the method according to the invention provides that the commissioning notification or the service notification comprises information about at least one auxiliary, in particular a tool, a replacement part or a safety means, required for performing the operations and/or actions.

Examples of tools are:
screwdrivers,
soldering or welding devices,
tongs, clamps, string cutters, etc., or
electronic devices, for example operating units for connection to a field device.
Examples of replacement parts are:
electronic elements,
sensor elements, or
fastening means such as screws, bolts, wires, etc.
Examples of safety means are:
gloves,
protective goggles, or
protective helmets.

According to an advantageous embodiment of the method according to the invention, it is provided that the mobile transport unit navigates to a storage location, after the reception of the commissioning notification or the service notification and before the step of guiding the operator to the installation position of the field device, and retrieves the auxiliary from there and carries it with it. In particular, the storage location can be the defined location in the installation at which the second communication link can be established and/or at which the mobile transport unit can be charged.

According to an advantageous embodiment of the method according to the invention, it is provided that the mobile transport unit has a camera unit, the transport unit checking, by means of the camera unit, whether the operator is carrying the required auxiliary with him, and, in the case that the operator is not carrying the required auxiliary with him, the mobile transport unit transferring the auxiliary to the operator and, in particular, navigating to a storage location before the transfer and collecting the auxiliary there. In this case, the image recognition can likewise be carried out using an AI algorithm.

According to an advantageous embodiment of the method according to the invention, it is provided that the commissioning notification or the service notification contains information about the correct use of the auxiliary, the mobile transport unit checking, by means of the camera unit, whether the auxiliary is correctly used by the operator, and, in the case that the operator is not using the tool or is not using it correctly, the mobile transport unit informing the operator about the correct application of the auxiliary, by means of the output unit. In this case, the image recognition can likewise be carried out using an AI algorithm. Depending on the output unit, the notification can be output in text form or by voice output.

According to an advantageous embodiment of the method according to the invention, it is provided that the mobile transport unit has a camera unit, the mobile transport unit observing the operator during the execution of the operating action by means of the camera unit and, in the event of an incorrect performance of operations or actions, informing the operator about the incorrect performance by means of the output unit.

Alternatively, it can be provided that the mobile transport unit has a camera unit, the mobile transport unit monitoring the operator during the execution of the operating action by means of the camera unit or checking the result of the operating action and confirming the correct performance by means of the output unit.

In both cases, image recognition can also be performed using an AI algorithm. The information and/or the confirmation can be output in text form or by voice output, depending on the output unit. This increases safety and ensures the correct performance of the operations or operating actions.

According to an advantageous embodiment of the method according to the invention, it is provided that, in the course of the assistance, the mobile transport unit performs at least one operation or action, and the operator being prompted to confirm each performed execution. In particular, this is advantageous in situations in which the field device is installed at a location that is difficult to reach for the operator, for example at a great height or tight surroundings, or in which the operator does not carry an operating unit with him. Thus, the mobile transport unit can, for example, connect to the field device by radio and, for example, carry out a parameterization or carry out a physical operation on the field device, for example the replacement of a component of the field device by a replacement part. The confirmation of the operator increases the degree of safety so that, for example, no incorrect parameter values are written to the field device.

According to an advantageous embodiment of the method according to the invention, it is provided that, in the event that the confirmation does not take place, the corresponding operation or action is reversed. The operator can actively refuse the confirmation. Alternatively, it can be provided to wait for a confirmation for a predetermined time period, and, if there is no confirmation, to reverse the corresponding operation or action after the time period has expired.

Furthermore, the object is achieved by a mobile transport unit which is designed for use in the method according to the invention. To carry out the method, the mobile transport unit has one or more software applications, for example apps, which each cause the execution of one or more method steps.

According to an advantageous embodiment of the mobile transport unit according to the invention, an airworthy drone, in particular a rotary drone, or an automated guided vehicle, is used. A rotary drone has one or more rotors. Examples of rotary rotors are single-rotor drones, tricopters, quadcopters, hexacopters or octocopters.

An automated guided vehicle (AGV) is a floor-bound conveying means having its own travel drive, which is controlled automatically and guided contact-free. Depending on the type of the installation and application of the field device, further types of mobile transport units can also be used, for example floating and/or submersible drones for underwater applications.

BRIEF DESCRIPTION OF THE DRAWINGS

The invention is explained in greater detail with reference to the following figures, in which.

DETAILED DESCRIPTION

The method according to the invention consists of two essential method steps:

1). guidance of an operator BN by means of a mobile transport unit MT to a field device FG on which an operating action is to be carried out, and 2) assistance of the operator BN by means of the mobile transport unit MT while performing the operating action.

Figure 1:
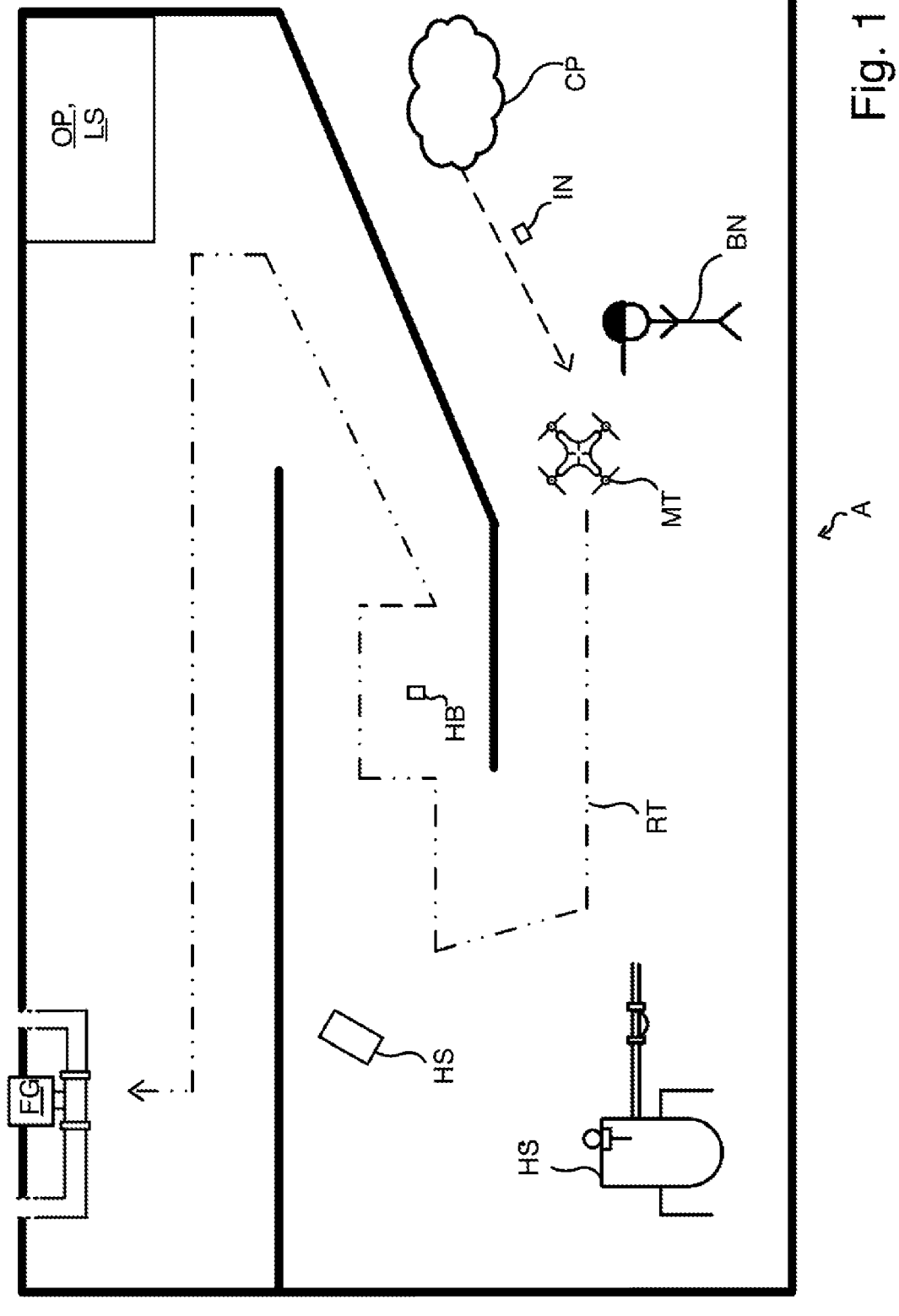
FIG. 1 shows an example for carrying out the first method step of the method according to the present disclosure.

FIG. 1 illustrates the first method step by way of example. A field device FG in the form of a flowmeter is installed in an installation A. During operation, an error occurs on the field device FG—the measured values of the flow are outside a permitted range, the field device FG delivers the error message "out of spec". Since measurements by a secondary flowmeter do not show any deviation and the process is also taking place normally otherwise, the error is on the field device FG itself. Thereupon, a service notification IN is created in an application of a cloud-based platform CP, in the control room. In order to eliminate the service case as quickly as possible, an operator BN, specifically a service personnel employee, is sent to the installation A.

The installation A has a plurality of different measuring points, each having a plurality of field devices. For an operator BN who is not familiar with the installation A, it is a time-consuming procedure to identify, locate and find the field device FG to be found, by means of an installation map. For this reason, a mobile transport means MT in the form of a rotary drone is made available to the operator BN. Via a communication link, for example established by a mobile radio network, the service notification IN is transmitted from the cloud-based platform CP to the mobile transport unit MT. The service notification IN contains the identification of the relevant field device FG, as well as at least one operating action to be carried out on the field device FG, or information about said action, in order to be able to remedy the error at the field device FG.

Based on the identification of the field device FG, the mobile transport unit determines the location position of the field device FG or its installation position in the installation A. For this purpose, an installation map, which contains the location position of all field devices in the installation A, is stored in the mobile transport unit MT. If the installation map is not current or the field device FG is not yet present (for example if it is still to be commissioned), the mobile transport unit MT retrieves the location position of the field device FG from the cloud-based platform. Alternatively, the location position of the field device FG can also be included in the service identification.

By means of a position determination unit, in particular a GPS system, the mobile transport unit MT determines its current location position and creates a route RT to the field device FG using the installation map. The installation map also has location positions and dimensions of stationary obstacles HS, HS', in this example a switch cabinet as a stationary obstacle HS, a measuring point comprising a tank and a pipeline as stationary obstacle HS' The route RT is planned in such a way that the route RT leads past the stationary obstacles HS, HS' at a sufficiently large distance.

After the creation of the route RT, in particular after a confirmation by the operator BN, the navigation of the mobile transport unit MT through the installation A along the route RT begins. For navigating, the mobile transport unit uses the position determination unit and one or more built-in camera units KA. The mobile transport unit MT navigates autonomously along the route RT through the installation, the operator BN following the mobile transport unit. By means of the camera unit KA, the mobile transport unit MT firstly checks whether the operator BN is still following or that the distance from the operator does not become too great, and adjusts the navigation speed accordingly.

Secondly, the path lying ahead of the mobile transport unit, or the environment, is scanned for further obstacles HB, HS, HS'. In particular, the path or the environment is scanned with respect to further stationary obstacles HS, HS', for example cable ducts, thresholds, tensioned cables, pallets, etc., which are difficult for the operator to identify, in particular in the dark, and could cause injury. Scanning is also carried out with regard to movable obstacles HB, for example further personnel in the installation or further mobile transport units. When a further obstacle HS, HS', HB is detected, the operator BN is made aware of the obstacle HS, HS', HB by means of an output unit AE, AE', AE" of the mobile transport unit MT, in particular by voice output. Furthermore, the route RT is adapted accordingly, such that the obstacle HS, HS', HB is bypassed.

The navigation ends upon reaching the field device FG. Subsequently, the mobile transport unit assists the operator BN when performing the operating action to overcome the error.

Figures 2A, 2B, 2C, 2D:
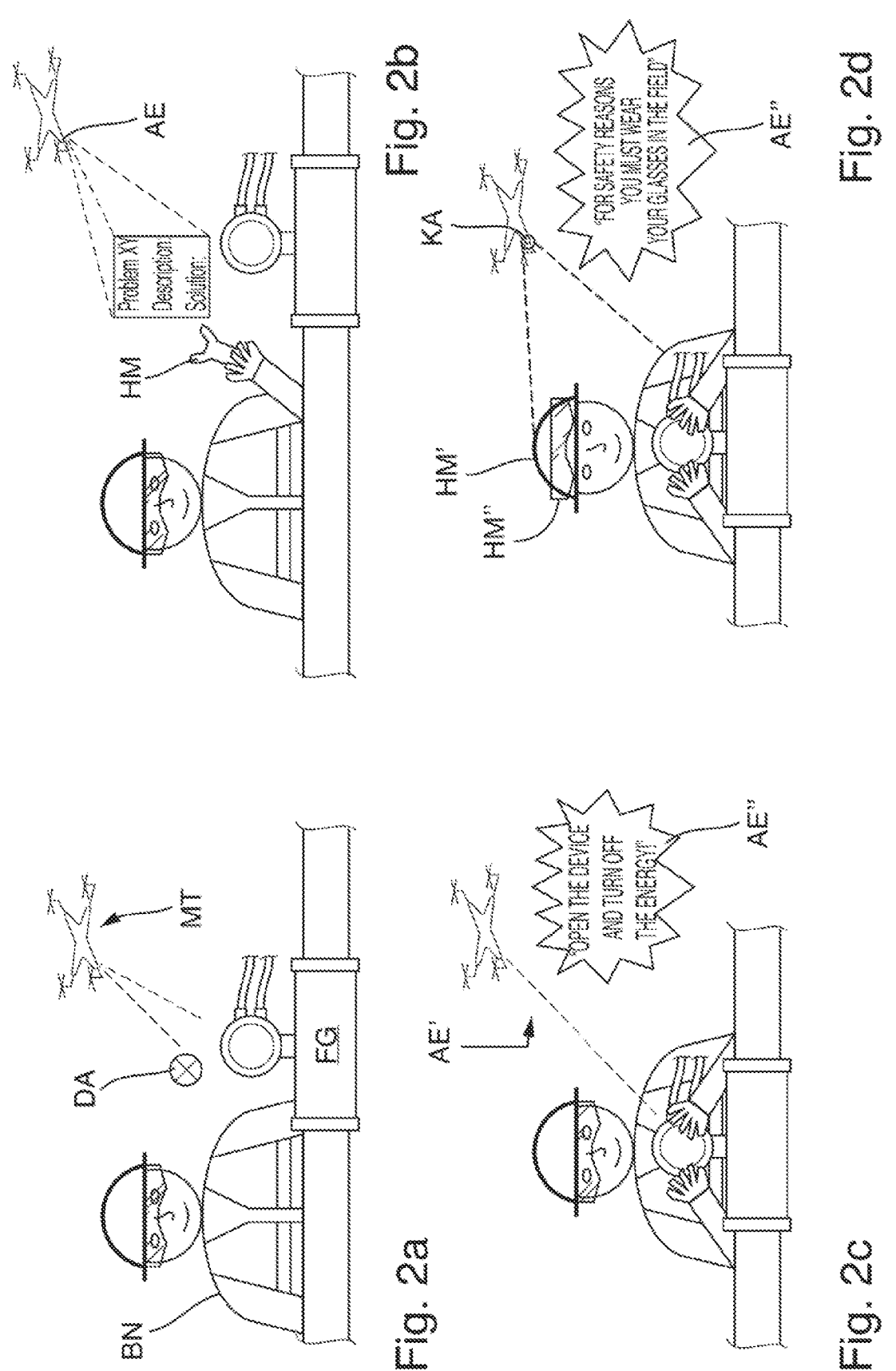
FIG. 2 shows a plurality of examples for carrying out the second method step of the method according to the present disclosure.

FIG. 2 shows a plurality of examples of how the mobile transport unit MT can assist the operator BN when performing the operating action. The following list is not exhaustive, and therefore the invention comprises a plurality of further assistance processes.

a) Retrieving Further Data DA from the Field Device FG:

In order to support the operator BN in the best possible manner when performing the operating action, further data DA of the field device FG, which are not included in the service notification IN, are required, in particular parameter or configuration settings, a device status or measured values.

For this purpose, the mobile transport unit MT establishes a wireless communication link to the field device FG and reads out the corresponding data DA. For this purpose, it can be provided that the mobile transport unit MT must authenticate itself with the field device FG. For this purpose, the operator BN is requested to input login data or a biometric feature via an input unit of the mobile transport unit or via an operating unit that is connected (wirelessly) to the mobile transport unit MT, for example a smartphone. Alternatively, the mobile transport unit MT retrieves the required authentication information from the cloud-based platform CP.

b) Explaining the Error:

The mobile transport unit MT has an output unit AE in the form of a projector, by means of which the error is explained to the operator BN. For this purpose, the mobile transport unit MT projects the name of the error, a description of the error, as well as first suggestions for the elimination of the error in a suitable area in the installation, in the vicinity of the field device FG, for example on a wall. The suggestions for eliminating the error are received by the mobile transport unit MT from the cloud-based platform CP. For this purpose, provision can be made for the mobile transport unit MT to transmit the data DA of the field device FG, retrieved in example a), to the cloud-based platform CP. The cloud-based platform CP generates, for example by means of an AI algorithm, on the basis of the type of error or the data of the field device FG, the suggestions for the elimination of the error. Alternatively, it is provided that the mobile transport unit MT itself has a corresponding intelligence, in order to automatically create the suggestions for the elimination of the error and/or the description of the error.

In addition to the information mentioned, the mobile transport unit MT can visualize installation information and/or product information of the field device FG by means of the projector AE, which the mobile transport unit MT retrieves, in particular from the cloud-based platform CP.

It can furthermore be provided that the service notification, or the suggestions for the elimination of the error, contain an indication of the required auxiliaries, for example a tool in the form of a screwdriver HM. By means of the camera unit KA, the mobile transport unit MT checks whether the operator BN carries the corresponding auxiliary HM with him. If this is not the case, the mobile transport unit MT automatically navigates to a defined location position OP in the installation A, for example to a storage location LS, retrieves the tool from there, and brings it back to the operator BN.

Provision can be made for one or more such defined location positions OP to be present in the installation. Additionally or alternatively to a storage location LS, it can be locations at which the mobile radio network is guaranteed to be provided. In the event that the mobile transport unit MT cannot receive the mobile radio network and cannot establish a communication link to the cloud-based platform CP at the location position of the field device FG, the mobile transport unit MT navigates to this location position OP, in the event that data must be transmitted to or received from the cloud-based platform CP. Alternatively or additionally, the location has a charging option for the mobile transport unit MT, in order to charge the electrical energy stores thereof.

c) Assistance by Means of Voice Output:

The operating action for eliminating the error requires one or more operations or actions to be undertaken by the operator BN. By means of a voice output via a loudspeaker AE", the mobile transport unit MT guides the operator through the various operations or actions to be carried out.

In the present example, the mobile transport unit MT instructs the operator to open the housing cover of the field device FG and to switch off the field device FG. By means of a laser AE', the mobile transport unit MT points to locations or components relevant for the operation or action to be carried out, in the present case on the housing cover.

It may be the case that, despite assistance by the mobile transport unit, certain actions or operations are unclear to the operator BN. For this purpose, said operator can ask the mobile transport unit MT questions, for example via a microphone built into the mobile transport unit MT. By means of an AI algorithm, which is executed in the mobile transport unit MT or the cloud-based platform, the questions are analyzed, corresponding responses are generated, and the generated responses are output via one or more of the output units AE, AE', AE".

d) Checking the Correct Use of an Auxiliary:

Provision can be made for the mobile transport unit MT to observe the operator BN during the execution of the operating action, by means of the camera unit KA.

For example, the service notification contains the indication that one or more auxiliaries HM', HM" in the form of safety means are mandatory for performing the operating action. In the present case, these are a protective helmet HM' and safety glasses HM".

The mobile transport unit MT checks, by means of the camera unit KA, whether the operator BN is carrying these safety means HM', HM" with him, and retrieves them from the storage location LS, analogously to example b), in the event that the operator BN is not carrying one or more of the safety means HM', HM" with him.

Furthermore, the mobile transport unit MT checks, by means of the camera unit KA, whether the operator is correctly wearing or using the safety means HM', HM". In the present case, the operator BN is using the protective helmet HM' correctly, but is not wearing the safety glasses HM". The mobile transport unit MT makes the operator BN aware of this via the output unit AE, AE'.

The mobile transport unit MT checks, by means of the camera unit KA, whether the operator BN is correctly performing the operations or actions to be carried out, and makes the operator BN aware, if necessary, by means of the output unit AE, AE", that certain operations or actions are not being carried out correctly.

It can also be provided that the mobile transport unit MT itself performs actions or operations on the field device FG, in particular when the field device FG is accessible only with difficulty. In this case, the mobile transport unit MT must be able to have the operator BN confirm any operation or action carried out, in order to avoid errors.

The method steps and operations described in FIG. 1 and FIG. 2 are to be understood as being by way of example. The method according to the invention allows a large number of further applications. The field device FG and the mobile transport unit MT can also be designed differently than described, for example with respect to the type of field device FG and/or with respect to the type of mobile transport unit MT used.

The invention claimed is:

1. A method for commissioning a field device or a service job on the field device in an installation of automation technology, said method comprising:

providing a mobile transport unit designed for navigation in the installation, the mobile transport unit having: a position determination unit; at least one output unit; and a camera unit;

transmitting a commissioning notification or a service notification to the mobile transport unit, wherein the commissioning notification or the service notification contains an identification of the field device and at least one operating action to be carried out on the field device;

locating the installation position of the field device in the installation by the mobile transport unit on the basis of the identification of the field device;

guiding an operator to the installation position of the field device via autonomous navigation of the mobile transport unit through the installation, using the position determination unit, wherein the operator follows the mobile transport unit;

monitoring, via the camera unit, the operator during the guidance of the operator and adjusting a speed of the mobile transport unit during the autonomous navigation to a speed of the operator; and assisting the operator when performing the at least one operating action, wherein the mobile transport unit specifies and/or explains to the operator all operations or actions to be carried out in order to successfully perform the at least one operating action, via the at least one output unit.

2. The method according to claim 1, wherein, in the course of the assistance, the mobile transport unit establishes a wireless first communication link and reads out data, including parameter, configuration settings, a device status, or measured values, from the field device via the wireless first communication link, wherein the specification and/or explanation of the operations or actions to be carried out is adapted to the read-out data.

3. The method according to claim 1, wherein the mobile transport unit is at least temporarily in a second communication link, via the Internet, with a cloud-based platform, wherein the commissioning notification or the service notification is transmitted via the second communication link from the cloud-based platform to the mobile transport unit.

4. The method according to claim 3, wherein the mobile transport unit, in the event that the second communication link cannot be established at a current location position of the mobile transport unit, navigates to a defined location position in the installation, at which defined location position the second communication link can be established, wherein the mobile transport unit establishes the second communication link after the navigation to the defined location position, and wherein the mobile transport unit temporarily stores data to be transmitted to the cloud-based platform and/or the commissioning notification or service notification that was transmitted from the cloud-based platform, before or after the establishment of the second communication link at the defined location position.

5. The method according to claim 1, wherein the mobile transport unit indicates movable and/or stationary obstacles to the operator during navigation by means of the at least one output unit, wherein the mobile transport unit detects and identifies the movable or stationary obstacles via the camera unit, and/or wherein the stationary obstacles have been previously made known to the mobile transport unit by means of an installation map stored on the mobile transport unit.

6. The method according to claim 1, wherein a display or a projector is used as the at least one output unit, wherein, for the specification and/or explanation of the operations or actions to be carried out, installation information and/or product information of the field device are visualized.

7. The method according to claim 1, wherein an acoustic reproduction means is used as the at least one output unit, wherein the specification and/or explanation of the operations or actions to be carried out takes place via voice output.

8. The method according to claim 7, wherein an artificial voice used for the voice output varies with respect to a volume, a voice color, and/or a speech speed depending on a criticality of the operation or action to be carried out.

9. The method according to claim 8, wherein the mobile transport unit has an additional output unit in the form of a laser pointer, wherein the mobile transport unit points, by means of the additional output unit, during the specification and/or explanation of the operations or actions to be carried out, at places on the field device or components of the field device and/or the installation necessary for carrying out the operations or actions.

10. The method according to claim 1, wherein, in the course of the assistance, the operator asks questions on the mobile transport unit with respect to the operations or actions to be carried out, and wherein the mobile transport unit outputs, to the operator, further information regarding the operations or actions to be carried out, via the at least one output unit, depending on the questions.

11. The method according to claim 10, wherein the mobile transport unit has an input unit, including a microphone unit or a touch display, for inputting the questions, wherein the mobile transport unit analyzes the questions using an AI algorithm or using additional data retrieved from the field device and/or from a cloud-based platform, and wherein the mobile transport unit generates the further information by means of the AI algorithm or the additional data.

12. The method according to claim 10, wherein the mobile transport unit has an input unit, including a microphone unit or a touch display, for inputting the questions, and wherein the mobile transport unit transmits the questions via a second communication link to a cloud-based platform, wherein the cloud-based platform analyzes the questions by means of an AI algorithm or additional data, wherein the cloud-based platform generates the further information via the AI algorithm or the additional data, and wherein the cloud-based platform transmits the further information via the second communication link to the mobile transport unit.

13. The method according to claim 1, wherein the commissioning notification or the service notification contains information about at least one auxiliary required for carrying out operations or actions, including a tool, a replacement part or a safety means.

14. The method according to claim 13, wherein, after the reception of the commissioning notification or the service notification and before the step of guiding the operator to the installation position of the field device, the mobile transport unit navigates to a storage location and collects the required at least one auxiliary from the storage location and carries the at least one auxiliary.

15. The method according to claim 13, wherein the mobile transport unit checks, via the camera unit, whether the operator is carrying the required at least one auxiliary, and wherein, in the event of the operator not carrying the required at least one auxiliary, the mobile transport unit transfers the required at least one auxiliary to the operator and, before the transfer, navigates to a storage location and collects the required at least one auxiliary from the storage location.

16. The method according to claim 15, wherein the commissioning notification or the service notification contains information about a correct use of the required at least one auxiliary, wherein the mobile transport unit checks, using the camera unit, whether the required at least one auxiliary is correctly used by the operator, and wherein in the case that the operator is not using the tool or is not using it correctly, the mobile transport unit informs the operator of the correct application of the required at least one auxiliary via the at least one output unit.

17. The method according to claim 1, wherein the mobile transport unit monitors the operator during the performing of the at least one operating action using the camera unit and, in the event of an incorrect performance of the operations or actions, informs the operator, via the at least one output unit, about the incorrect performance of the operations or actions.

18. The method according to claim 1, wherein the mobile transport unit observes the operator during the performing of the at least one operating action by means of the camera unit or checks a result of the at least one operating action and confirms a correct performing of the at least one operating action by means of the at least one output unit.

19. The method according to claim 1, wherein in the course of the assistance, the mobile transport unit performs at least one operation or action of the operations or actions, and wherein the operator is requested to confirm each operation or action of the at least one operating action.

20. The method according to claim 19, wherein, in the event that the confirmation does not occur, the mobile transport unit reverses the at least one operating action.

* * * * *